(12) United States Patent
Furlow

(10) Patent No.: US 8,480,067 B2
(45) Date of Patent: Jul. 9, 2013

(54) ADJUSTABLE FLIP STOP ASSEMBLY FOR POSITIONING A WORK PIECE

(76) Inventor: Dennis L Furlow, Ashville, NY (US)

(*) Notice: Subject to any disclaimer, the term of this patent is extended or adjusted under 35 U.S.C. 154(b) by 415 days.

(21) Appl. No.: 12/902,792

(22) Filed: Oct. 12, 2010

(65) Prior Publication Data

US 2011/0084435 A1    Apr. 14, 2011

Related U.S. Application Data

(60) Provisional application No. 61/250,721, filed on Oct. 12, 2009.

(51) Int. Cl.
*B23Q 3/18* (2006.01)
(52) U.S. Cl.
USPC ............................... 269/315; 269/71; 269/74
(58) Field of Classification Search
USPC .................. 269/315, 303, 290, 291, 305, 71, 269/74, 76, 73
See application file for complete search history.

(56) References Cited

U.S. PATENT DOCUMENTS

| | | | |
|---|---|---|---|
| 5,415,383 A * | 5/1995 | Ausilio | 269/238 |
| 7,007,938 B2 * | 3/2006 | Nakata et al. | 269/32 |
| 7,386,926 B2 * | 6/2008 | Bosche et al. | 29/227 |
| 8,020,840 B2 * | 9/2011 | Hall et al. | 269/6 |
| 2008/0237957 A1 * | 10/2008 | Waldorf | 269/27 |
| 2011/0084435 A1 * | 4/2011 | Furlow | 269/315 |

* cited by examiner

*Primary Examiner* — Lee D Wilson

(57) ABSTRACT

An improved adjustable work stop device for use in positioning work pieces which for machining purposes are clamped in a vice or other clamping means. The work stop comprises a laterally adjustable base, a flipper mount with flip arm movable in a vertical direction and lockable into desire position thereto, a flip arm with a positioner which is pivotably secured and rotates away from the work piece without scrubbing the work piece surface whereby clearance for machining, work or the like is accomplished on the butted side of the work piece.

9 Claims, 4 Drawing Sheets

ADJUSTABLE FLIP STOP ASSEMBLY FOR POSITIONING A WORK PIECE

CROSS-REFERENCE TO RELATED APPLICATIONS

This application claims the benefit of provisional patent application No. 61/250,721 filed 2009 Oct. 12 by the present inventor.

FEDERALLY SPONSORED RESEARCH

None

SEQUENCE LISTING OR PROGRAM

None

BACKGROUND OF THE INVENTION

1. Field

This relates to work positioning for CNC and manual machining, specifically to the use of stops for time saving and precision machining where one or multiple set-ups may be required.

2. Prior Art

In a working or manufacturing environment, the need to quickly set up for production impacts profitability. In addition to quick set up is the need for accuracy in repeatability, to repeat the work piece positioning quickly and accurately.

Several work stops have been patented. U.S. Pat. D264216 to Saupe and Crawford (1982), D269518 to Karlan (1983), U.S. Pat. Nos. 6,029,967 to Wolfe (2000), 4,030,718 to Philipoff (1977) lack the allowance for free access to the work piece on the side of the work stop without unclamping and again having to handle and re-setup the work piece, using time and therefore cost.

There are a couple of work stops which do move away for machining, however they will scrub against the work piece thereby causing imprecision in the current work piece or a future work piece—for example, U.S. Pat. No. 3,827,686 to Storkh (1974) and U.S. Pat. D535671 to Bernhardt (2007).

REFERENCES CITED

| | |
|---|---|
| U.S. Pat. No. 1,068,170 | DRILL BRACKET |
| U.S. Pat. No. 1,071,289 | WORK HOLDING BLOCK |
| U.S. Pat. No. 2,450,931 | CHUCK |
| U.S. Pat. No. 2,788,686 | SELF-CENTERING VISE FOR CYLINDRICAL OR TAPERED WORK PCS |
| U.S. Pat. No. 2,823,567 | VISE ROD MOUNTING A FIXED JAW & ADJUSTABLE FULCROMED PIVOT |
| U.S. Pat. No. 2,913,019 | TOOL HOLDER |
| U.S. Pat. No. 3,066,930 | HOLDING TONGS |
| U.S. Pat. No. 3,810,311 | LOCATING STOP FOR WORK TO BE MACHINED |
| U.S. Pat. No. 3,827,686 | STOP DEVICES |
| U.S. Pat. No. 3,961,557 | QUICK-LOCKING MACHINE STOP |
| U.S. Pat. No. 3,967,816 | FIXTURE BLOCK SERVING AS A MANUFACTURING ACCESSORY |
| U.S. Pat. No. 4,030,718 | UNIVERSALLY ADJUSTABLE VISE STOP |
| U.S. Pat. No. 4,274,802 | AUTOMATED DEVICE |
| U.S. Pat. No. 5,493,767 | SYSTEM & METHOD FOR POSITIONING WORK PIECES IN CNC MACHINE |
| U.S. Pat. No. 5,621,965 | METHOD OF DEFLECTING WORKPIECE TO ESTABLISH RIGIDITY |
| U.S. Pat. No. 5,816,568 | COUPLER FOR CABLE CONVEYORS |
| U.S. Pat. No. 5,845,555 | MULTI-POSITION ADJUSTABLE WORK STOP ASSEMBLY |
| U.S. Pat. No. 5,887,861 | WORKPIECE STOP DEVICE |
| U.S. Pat. No. 6,029,967 | WORK STOP SYSTEM & JAW PLATE FOR HOLDING THE SAME |
| U.S. Pat. No. 6,039,312 | WORKPIECE CLAMPING SYSTEM |
| U.S. Pat. No. 6,079,703 | CLAMPING/SECURING/CONNECTING SYSTEM |
| U.S. Pat. No. 6,109,601 | FLY TYPING DEVICE |
| U.S. Pat. No. 6,360,642 | WORKPIECE GUIDE W/POSITIONABLE GUIDE SURFACE |
| U.S. Pat. No. 6,543,973 | AUTOMATICALLY RETRACTABLE POSITIONING STOP FOR MACHINING TABLE |
| U.S. Pat. No. 6,557,601 | MECHANICAL STOP SYSTEM |
| U.S. Pat. No. 6,622,997 | STRAIGHT EDGE CLAMPING DEVICE FOR CLAMPING WORKPIECE |
| U.S. Pat. No. 6,641,125 | VISE STOP |
| U.S. Pat. No. 6,883,792 | VISE JAW W/WORK STOP |
| U.S. Pat. No. 6,889,968 | INSERTA CLAMP |
| U.S. Pat. No. 7,152,855 | VICE JAW W/WORK STOP |
| U.S. Pat. D231663 | LOCATING STOP FOR WORK TO BE MACHINED |
| U.S. Pat. D232761 | TOOL HOLDER FOR A LATHE TOOL OR SIMILAR ARTICLE |
| U.S. Pat. D239131 | FLEXIBLE INSTRUMENT HOLDER & POSITIONER |
| U.S. Pat. D255578 | GRINDING & MACHINE DOG |
| U.S. Pat. D264216 | ADJUSTABLE STOP FOR POSITIONING A WORKPIECE IN MILL MACHINE |
| U.S. Pat. D269518 | MILLING MACHINE TABLE STOP OR SIMILAR ARTICLE |
| U.S. Pat. D271772 | GRINDING FIXTURE |
| U.S. Pat. D294587 | TOOL HOLDER FOR A DRILL BIT OR THE LIKE |
| U.S. Pat. D302277 | T-NUT WORKHOLDER CLAMP |
| U.S. Pat. D336481 | COLLET HOLDING FIXTURE |
| U.S. Pat. D535671 | ADJUSTABLE TABLE TOP WORKSTOP ASSEMBLY FOR MACHINE TABLES |
| U.S. Pat. D578145 | ADJUSTABLE WORK STOP ASSY |
| U.S. Pat. PG 1515 | MSC INDUSTRIAL SUPPLY CO CATALOG 2008/2009 |

Thus several advantages of one or more aspects are to provide a faster, therefore less costly and more accurate work stop. Other advantages of one or more aspects are to allow for machining, work or the like to occur on the butted side of the work piece. These and other advantages of one or more aspects will become apparent from the description and accompanying drawings.

SUMMARY

In accordance with one embodiment, the adjustable flip stop is typically mounted to a surface or structure where a work piece, component or the like is moved against the adjustable flip stop for positioning the work piece.

DRAWINGS-FIGURES

Figure 1:
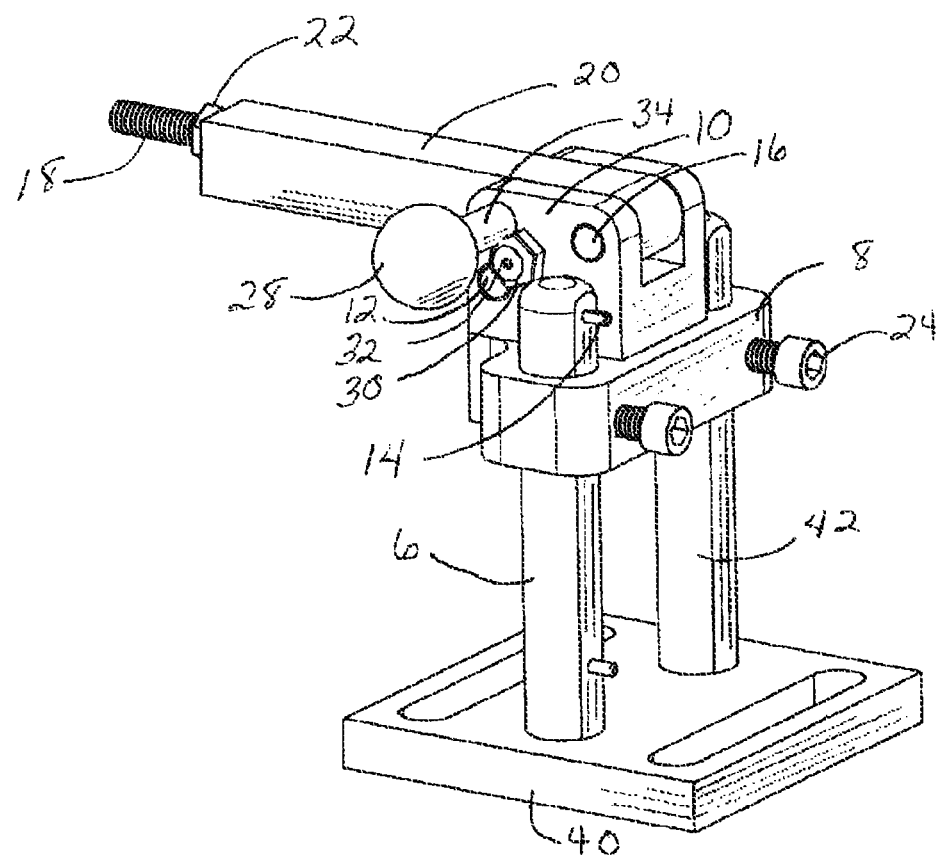
FIG. 1 is a perspective view of the adjustable flip stop according to the present embodiment

| DRAWINGS-REFERENCE NUMERALS | |
| --- | --- |
| 6 | left support shaft |
| 8 | slide support |
| 10 | flipper mount |
| 12 | large spring pin |
| 14 | spring pin |
| 16 | pivot pin |
| 18 | positioner |
| 20 | flip arm |
| 22 | lock nut |
| 24 | screws (3 Xs) |
| 26 | bottom screws |
| 28 | knob |
| 30 | spanner nut |
| 32 | screw |
| 34 | lock pin |
| 36 | inside dowels |
| 38 | inside screw |
| 40 | stop base |
| 42 | right support shaft |

DETAILED DESCRIPTION

Figure 2:
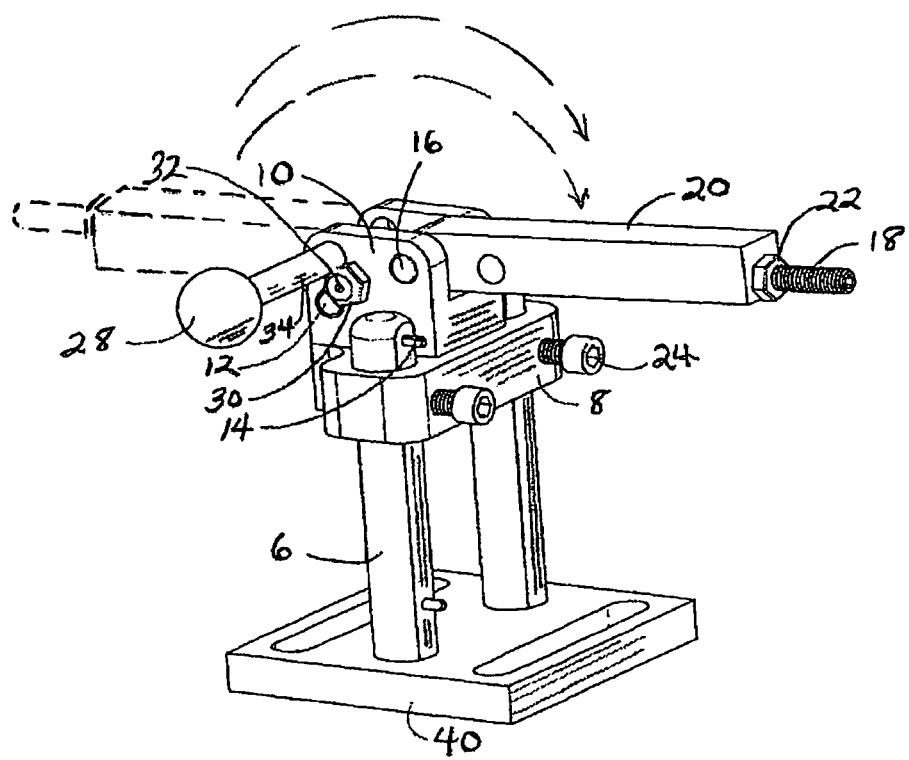
FIG. 2 is a perspective view of the adjustable flip stop with the flip arm pivoted open The dotted lines are for illustrative purposes only and are not part of the embodiment.
Figure 3:
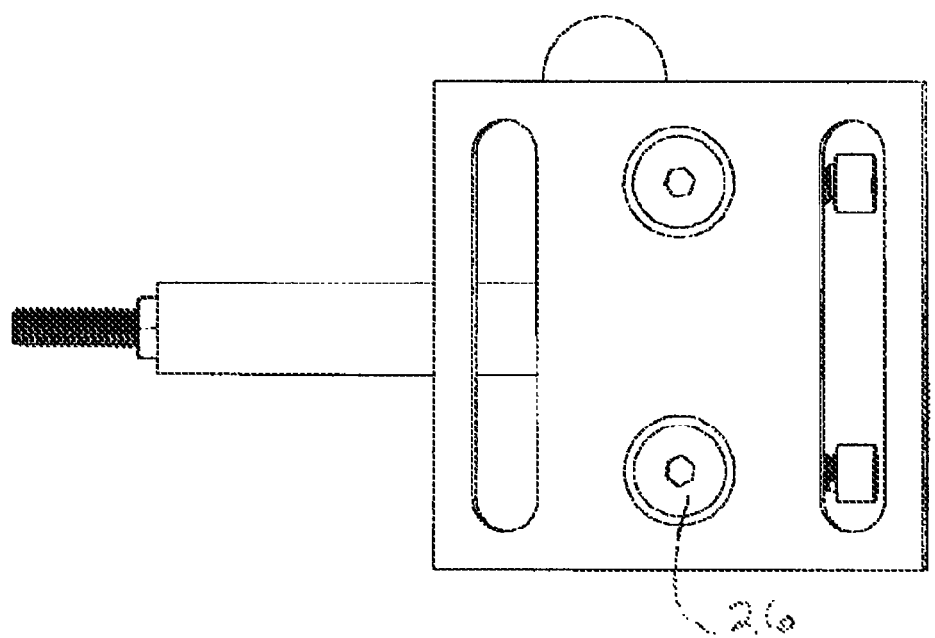
FIG. 3 is a bottom view of the adjustable flip stop according to the present embodiment
Figure 4:
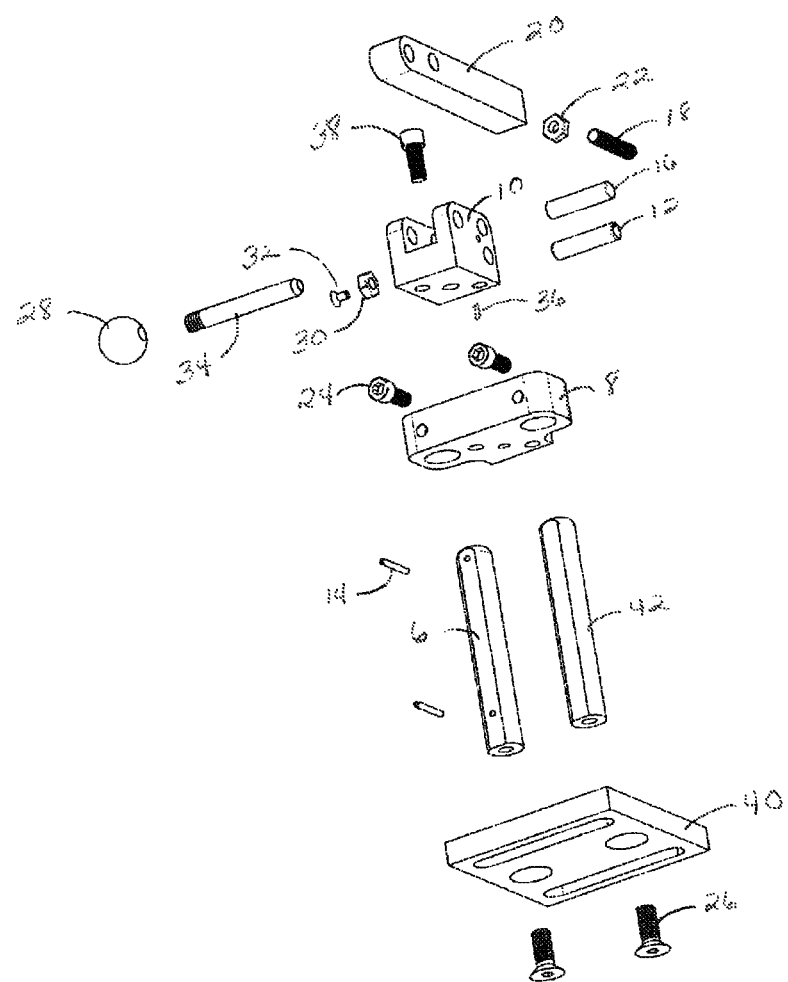
FIG. 4 is an exploded view of the adjustable flip stop according to the present embodiment

First Embodiment—FIGS. 1-4

One embodiment can be constructed of steel. A stop base 40 is connected to two support shafts 42 and 6 and held together with a screw 24. In the LH support shaft 6 are two spring pins 14. Attached to the support shaft 42 and 6 is a slide support 8. Holding the position of the slide support 8 on the support shaft 42 and support shaft 6 are the two screws 24. Mounted on the slide support 8 is a flipper mount 10. The flipper mount 10 is positioned by two dowels 36. The flipper mount is fastened by one screw 24. A flip arm 20 is attached to the flipper mount 10 using the dowel 36. Inside the flipper mount 10 contains a spring pin 12 which positions the flip arm 20 in the down position. A lock pin 34 slides in the flipper mount 10 to secure the flip arm 20 in place. A knob 28 is threaded onto a lock pin 34. The lock pin 34 is kept from being totally removed from the flipper mount 10 with a spanner nut 30. The spanner nut is held in position with a screw 32. The flipper mount 10 is positioned and secured to the slide support 8 using two inside dowels 36 and an inside screw 38. A positioner 18 is threaded into the flip arm 20. The positioner 18 is held in location with a locknut 22.

OPERATION

First Embodiment—FIGS. 1-4

The stop base 40 is secured to the table of a machine or any mounting work surface. The slots in the stop base 40 allow locating anywhere within range of the slots, thus allowing versatile locating. The stop base 40 provides a secure mounting surface for the support shafts 42 and 6. The support shafts 42 and 6 fit into a counter bore on the stop base 40 for exact locating. The screws 26 lock them into place. The upper spring pin 14 in the LH support shaft 6 keeps the slide support 8 from being removed from the support shafts 42 and 6. This prevents the slide support 8 and the like from falling off for safety purposes while the slide support 8 is in the upward position. The lower spring pin 12 keeps the support shaft 42 and 6 from meeting the stop base 40 to eliminate a pinch point for safety purposes. The slide support 8 slides on the support shafts 42 and 6 for adjustment of the adjustable flip stop. The slide support 8 is held in location using two screws 24 as they tighten against a flattened portion of support shafts 42 and 6.

The flipper mount 10 is positioned on the slide support 8 using two dowels 36. The screw 24 holds the flipper mount 10 tight to the slide support 8. The flipper mount 10 holds the flip arm 20. The flipper mount 10 keeps the flip arm 20 secure from moving side to side for accurate positioning. The flip arm 20 is attached to the flipper mount 10 using the pivot pin 16 in the flipper mount 10. The pivot pin 16 allows the flip arm 20 to pivot, rotate or swing at least 180 degrees for accurate positioning and clearance for machining or the like. The flip arm 20 is held in place using the lock pin 34 which slides through two holes in the flipper mount 10 and one hole in the flip arm 20 which locks it into place. While gripping the knob 28 attached to the lock pin 34 pull away from the adjustable flip stop. This allows the flip arm 20 to pivot a least 180 degrees from the original part positioning location, which enables clearance for machining or other processes required. When the flip arm 20 is pivoted back to the positioning location, then push inward on the knob 28, this secures the lock pin 34 in the flip arm 20 for accurate positioning. The spanner nut 30 is used to keep the lock pin 34 from pulling out as it fits into a machined flattened side of the lock pin 34. The spanner nut 30 is locked into position using the screw 32. The positioner 18 is used for fine adjustment to locate a part, component or the like. Simply rotate clock-wise or counter-clockwise to adjust. The lock nut 22 fixes the positioner 18 into operator's desired location.

A unique feature is the location of the pivot pin 16 to the positioner 18. The pivot point is below the center line of the positioner 18. This allows the positioner 18 end to pivot in a backwards motion, therefore the positioner 18 does not scrub against the part.

DESCRIPTION

Alternative Embodiment

Another embodiment is various possibilities as to construction materials of the adjustable flip stop, such as:
Stainless steel
Aluminum
Plastics
Wood
Brass Another embodiment is the adjustable flip stop could be made in various sizes.

Another embodiment is individual parts of the adjustable flip stop may be comprised of various shapes.

CONCLUSION, RAMIFICATIONS, AND SCOPE

Thus the reader will see that while the above description contains many specificities, these should not be construed as limitations on the scope of any embodiments, but as examples of some of the presently preferred embodiments. Many other ramifications and variations are possible within the designs of the various embodiments. For example, the embodiments can have different lengths, shapes, and sizes. In addition, the embodiments' can be manufactured from alternate materials such as, but not limited to aluminum, brass, stainless steel, 9i-pp most all ferrous and non-ferrous metals and plastics. Furthermore, the work stop could be plated, painted or coated and the like thereby changing the color and finish.

Thus the scope of the embodiments should be determined by the appended claim and its legal equivalents, and not by the examples given.

The invention claimed is:

1. A device for use in positioning work pieces for machining, working, a variety of purposes, and said workpieces which are clamped in a vice or other clamping means, said device comprising:
   a. a base to support positioning of a work piece for machining, work or a variety of purposes;
   b. a plurality of support shafts having a vertical axis mounted on said base;
   c. a means for vertical movement slidably parallel to said support shafts;
   d. a mounting means including a proximal and distal portion with said proximal portion being mounted on said means for vertical movement with respect to said base;
   e. a flip arm mounted pivotably on said mounting means said proximal portion wherein said flip arm is accurately position with respect to said work piece and said flip arm rotates without contacting said work piece to allow for said machining, for said work or for said variety of purposes;
   f. wherein said means for vertical movement comprises the slide support which has bored holes for said support shafts for vertical movement, screws in said slide support whereby fixing vertical location.

2. The device according to claim 1 wherein said base comprises slots parallel to allow for means of lateral movement of work stop.

3. The device according to claim 1 wherein said support shafts allow for vertical movement, said support shafts comprise of left and right sides and have a flat surface for locking means of vertical movement with screw wherein spring pins limit the means for vertical movement.

4. The device according to claim 1 wherein said biasing means comprises of a flipper mount with means of fixing to said slide support and means of pivotably retracting flip arm and means to limit travel and means of locking a flip arm in place.

5. The device according to claim 4 wherein said means of fixing comprises of a screw and dowels and said means of pivotably retracting said flip arm comprises a pivot pin wherein said flip arm pivots around axis of said pivot pin and said means to limit travel comprises a large spring pin wherein said flip arm rests on said large spring pin wherein said means of lock comprises a lock pin.

6. The device according to claim 5 wherein said means of lock comprises said lock pin with male thread to accommodate a knob wherein an opposing female thread allows attachment of a knob wherein said lock pin has flat surface so that a spanner nut limits travel of said lock pin wherein said spanner nut is held secure with a screw.

7. The device according to claim 1 wherein said flip arm comprises a lock nut and a positioner thereby providing a means of abutment to work piece.

8. A device for use in positioning work pieces for machining, working, a variety of purposes, and said workpieces which are clamped in a vice or other clamping means, said device comprising:
   a. a base to support positioning of a work piece for machining, work or a variety of purposes;
   b. a plurality of support shafts having a vertical axis mounted on said base;
   c. a means for vertical movement slidably parallel to said support shafts;
   d. a mounting means including a proximal and distal portion with said proximal portion being mounted on said means for vertical movement with respect to said base;
   e. a flip arm mounted pivotably on said mounting means said proximal portion wherein said flip arm is accurately position with respect to said work piece and said flip arm rotates without contacting said work piece to allow said machining, said work or said variety of purposes;
   f. wherein said support shafts allow for vertical movement, said support shafts comprise of left and right sides and have a flat surface for locking means of vertical movement with screw wherein spring pins limit the means for vertical movement.

9. A device for use in positioning work pieces for machining, working, a variety of purposes, and said workpieces which are clamped in a vice or other clamping means, said device comprising:
   a. a base to support positioning of a work piece for machining, work or a variety of purposes;
   b. a plurality of support shafts having a vertical axis mounted on said base;
   c. a means for vertical movement slidably parallel to said support shafts;
   d. a mounting means including a proximal and distal portion with said proximal portion being mounted on said means for vertical movement with respect to said base;
   e. a flip arm mounted pivotably on said mounting means said proximal portion wherein said flip arm is accurately position with respect to said work piece and said flip arm rotates without contacting said work piece to allow said machining, said work or said variety of purposes;
   f. a means of fixing comprises of a screw, a lock pin and dowels and a means of pivotably retracting said flip arm comprises a pivot pin wherein said flip arm pivots around axis of said pivot pin and a means to limit travel comprises a large spring pin wherein said flip arm rests on said large spring pin.

* * * * *